(12) United States Patent
Keller et al.

(10) Patent No.: US 6,781,083 B1
(45) Date of Patent: Aug. 24, 2004

(54) WELD OVERLAY SYSTEM

(76) Inventors: Howard Derrick Keller, 1 Old Tyler Ct., Greenville, SC (US) 29615; Joseph Riley Prince, 190 Bullman Rd., Roebuck, SC (US) 29376

( * ) Notice: Subject to any disclaimer, the term of this patent is extended or adjusted under 35 U.S.C. 154(b) by 0 days.

(21) Appl. No.: 10/210,974

(22) Filed: Aug. 2, 2002

Related U.S. Application Data

(60) Provisional application No. 60/310,961, filed on Aug. 8, 2001.

(51) Int. Cl.$^7$ ................................................. B23K 9/04
(52) U.S. Cl. ................. 219/76.15; 219/75; 219/125.11; 219/125.12
(58) Field of Search ........................... 219/76.12, 76.14, 219/76.15, 74, 75, 125.11, 125.12

(56) References Cited

U.S. PATENT DOCUMENTS

| | | | |
|---|---|---|---|
| 2,299,747 A | | 10/1942 | Harter |
| 2,427,350 A | | 9/1947 | Carpenter et al. |
| 2,756,311 A | | 7/1956 | Persson et al. |
| 2,868,954 A | | 1/1959 | Skinner et al. |
| 3,139,511 A | * | 6/1964 | Kudelko ..................... 428/683 |
| 3,274,371 A | * | 9/1966 | Manz et al. ............ 219/137 R |
| 3,549,857 A | | 12/1970 | Needham et al. |
| 3,573,420 A | | 4/1971 | Johnson |
| 3,626,138 A | | 12/1971 | Hurley |
| 3,770,932 A | | 11/1973 | Cotter et al. |
| 3,924,092 A | * | 12/1975 | Lessmann et al. ....... 219/76.15 |
| 3,999,031 A | | 12/1976 | Yonezawa et al. |
| 4,000,373 A | | 12/1976 | Lula et al. |
| 4,224,360 A | | 9/1980 | Ohnishi et al. |
| 4,431,447 A | | 2/1984 | Schick |
| 4,609,577 A | | 9/1986 | Long |
| 4,624,406 A | | 11/1986 | Yasuda et al. |
| 4,782,206 A | * | 11/1988 | Ayres et al. ............. 219/76.14 |
| 4,948,936 A | | 8/1990 | Landry |
| 5,306,358 A | | 4/1994 | Lai et al. |
| 5,569,396 A | | 10/1996 | Topolski |
| 5,686,002 A | * | 11/1997 | Flood et al. ............ 219/137 R |
| 5,714,729 A | * | 2/1998 | Yamada et al. ............... 219/75 |
| 6,013,890 A | | 1/2000 | Hulsizer |
| 6,204,477 B1 | | 3/2001 | Lai |
| 6,627,839 B1 | * | 9/2003 | Luckowski et al. ...... 219/76.14 |

FOREIGN PATENT DOCUMENTS

| | | | |
|---|---|---|---|
| JP | 51012349 | | 4/1976 |
| JP | 55-73479 | | 6/1980 |
| JP | 55-84276 | | 6/1980 |
| JP | 59-110474 | | 6/1984 |
| JP | 60133975 | | 7/1985 |
| JP | 64-83377 | * | 3/1989 |

* cited by examiner

*Primary Examiner*—Clifford C. Shaw
(74) *Attorney, Agent, or Firm*—Leatherwood Walker Todd & Mann, P.C.; Thomas W. Epting

(57) ABSTRACT

A process for applying weld overlay material to a tube with a single pass of a weld head. A gas tungsten arc welding process with high frequency wave pulse current is preferably used to apply the overlay material. The overlay material is preferably in the form of weld wire and is pre-heated and mechanically fed into the resultant weld pool on the tube. The wire is preferably resistance-heated to a temperature lower than its melting point prior to contact of the wire with the molten weld pool, and the weld pool is preferably oscillated during the overlay process. Use of the gas tungsten arc welding process provides sufficient weld fusion to allow the overlaid tube to be subsequently bent and formed, and use of the high frequency wave pulse current provides for reduced dilution of the overlay.

36 Claims, 3 Drawing Sheets

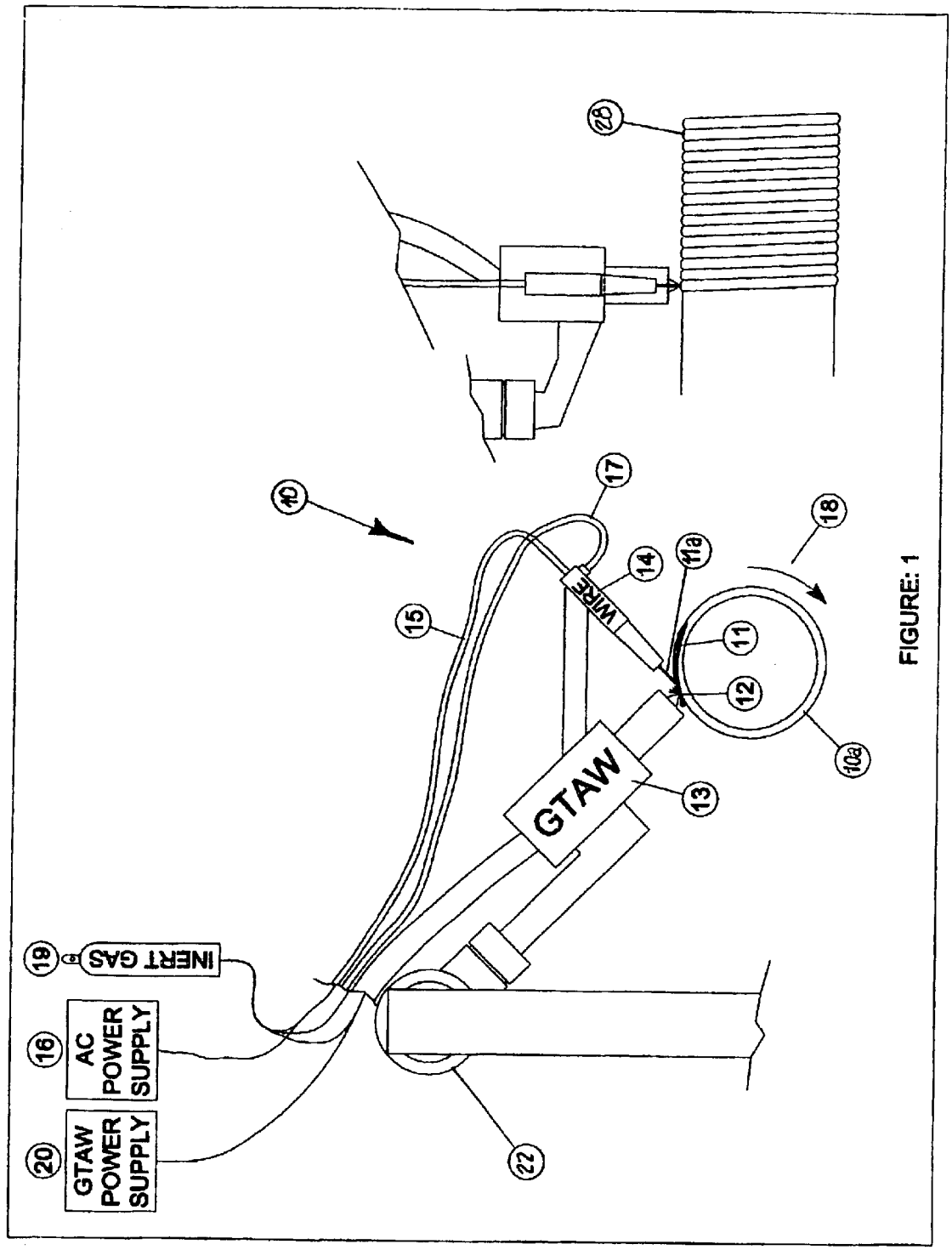
FIGURE: 1

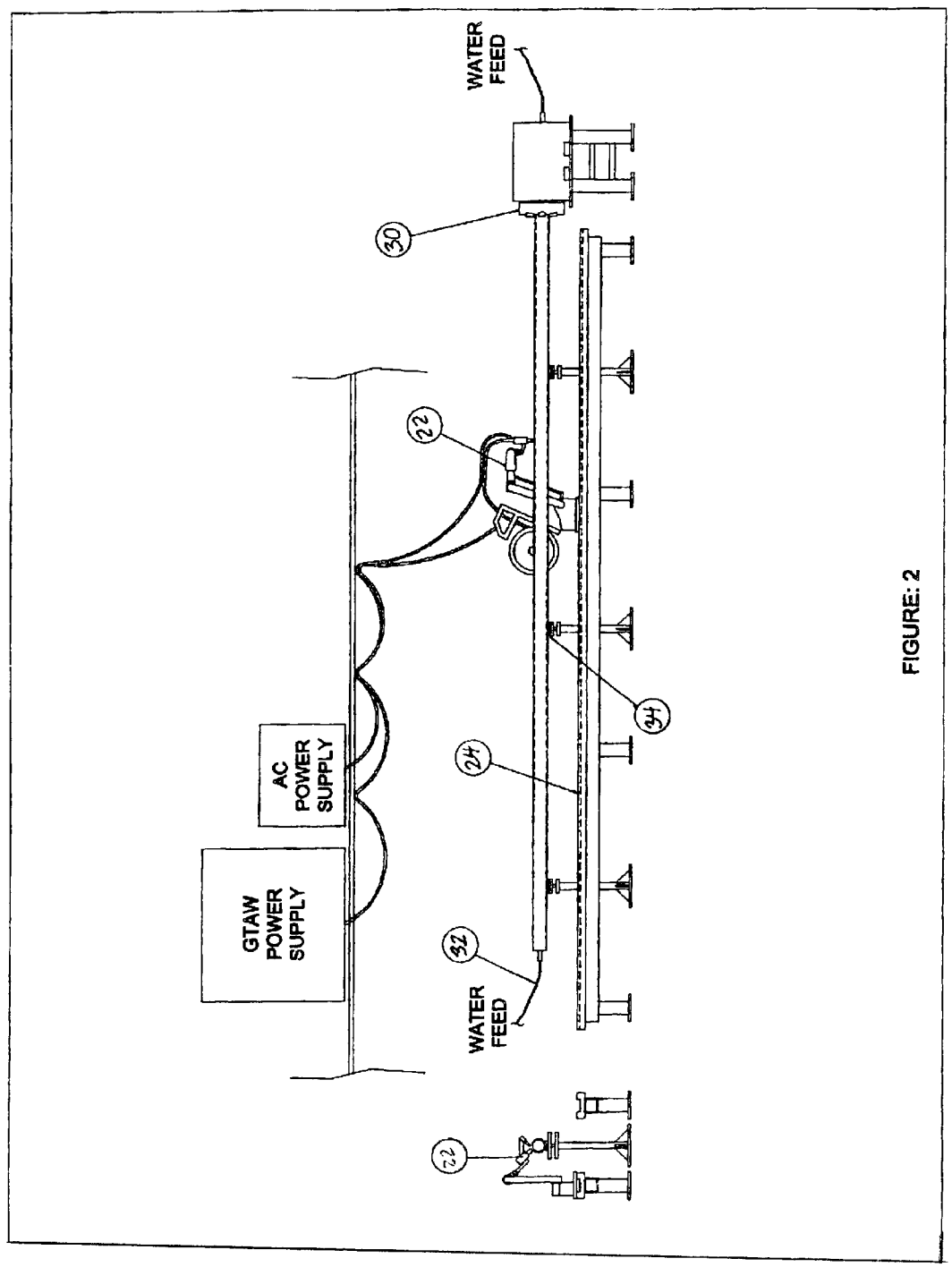
FIGURE: 2

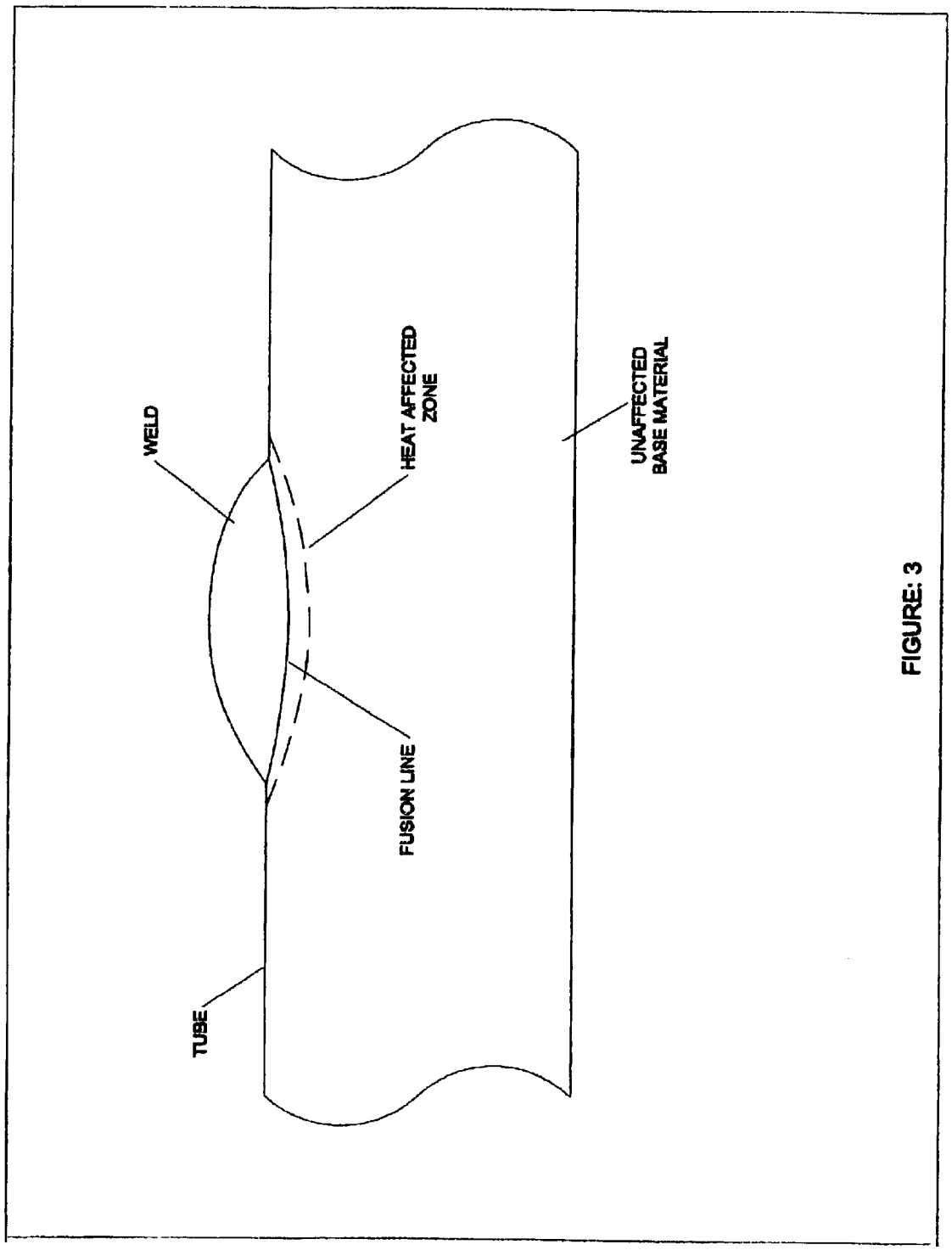

WELD OVERLAY SYSTEM

CROSS REFERENCE TO RELATED APPLICATION

This application claims benefit of U.S. Provisional application Ser. No. 60/310,961, filed Aug. 8, 2001, the entirety of the disclosure of which is incorporated herein by reference thereto.

BACKGROUND OF THE INVENTION

This invention relates to a method and equipment for weld overlay of metal tubing. More specifically, the invention relates to a system which employs a welding process to overlay conventional metal tubing in a single pass.

Boilers are used in the power generation, paper, steel and waste-to-energy industries, and these industries have an interest in finding means to protect and extend the operating cycles of their boilers. The concerns of boiler operating cycles arise from the fuel used by the boiler, methods of combustion, and/or impact of environmental regulations. Boilers generally use tubing, and such tubing may have structural characteristics and must be corrosion resistant as well, in view of the high temperature and corrosive conditions within boilers.

In certain types of boilers, such as coal-fired, black liquor recovery and waste-to-energy boilers, there is a particular need for corrosion and/or erosion resistance. In such instances, a solution is normally found in applying overlay to tubing used in the boilers with an alloy having desired corrosion and erosion protection.

When tubing is weld overlaid, the weld penetration of the tubing needs to be carefully controlled to ensure good fusion between a weld overlay bead and tube stock, as well as between each weld bead. The exterior surfaces of the weld overlay need to be smooth, and the thickness of the weld overlay needs to be uniform. Conventional welding processes may produce excessive weld penetration, with dilution of the base metal into the weld metal in excess of 40%. Weld overlays with this high dilution are not acceptable.

In conventional application of weld overlay, if the voltage and current of the weld head are controlled to ultimately provide a smooth exterior surface on the weld overlays, then weld penetration of the tube stock may tend to be excessive and uneven, and this can result in excessive dilution.

On the other hand, if the voltage and current are controlled to provide optimum weld penetration, then the exterior surface of the weld overlay may tend to be rough and uneven. A rough surface finish provides greater chance for corrosion media to deposit and start localized corrosion sites in the overlays. This can also make tubes more difficult to bend, which can result in an uneven distribution of the stresses during bending. A rough and uneven weld overlay surface can also affect the thickness and resulting dimensions of the tube.

Certain weld overlay methods have been patented. For example, U.S. Pat. No. 6,013,890, issued to Hulsizer, discloses a dual weld pass overlay method and apparatus which uses a first weld head to apply a bead of weld overlay material onto a tube, and thereby create a heat-affected zone in the tube. A second weld head is then used to heat the material within the heat-affected zone to "a temperature higher than its tempering temperature but lower than its Ae1 temperature." U.S. Pat. No. 6,204,477 B1, issued to Lai, also discloses a weld overlay method.

However, a need still exists for a weld overlay process which can provide uniform weld penetration on tube stock, uniform fusion, a smooth and even exterior surface, and also, which can control the thickness of the overlay and the dimensions of the pipe.

SUMMARY OF THE INVENTION

It is, therefore, the principal object of this invention to provide a method and apparatus for performing a single pass weld overlay.

Another object of the present invention is to provide a weld overlay system.

Another object of the present invention is to provide a weld overlay system using a gas tungsten arc welding head for applying a weld overlay bead to a tube.

Still another object of the present invention is to provide a weld overlay system using a gas tungsten arc welding head with high frequency wave pulse current to apply a weld overlay bead onto a tube.

Yet another object of the present invention is to provide a weld overlay system wherein heat is applied to weld material prior to being applied to a tube.

A still further object of the present invention is to provide a weld overlay system using a gas tungsten arc welding process which provides reduced dilution of the base metal into the weld metal of the tube.

Another object of the present invention is to provide a weld overlay system for minimizing weld penetration into the tubing, providing proper uniform fusion, and for providing a smooth and uniform exterior surface of the weld overlay.

Yet a further object of the present invention is to provide a weld overlay system offering improved control of the thickness of the overlay applied to a tube.

The present invention includes a process for applying a weld overlay to a tube with a single pass of a weld head. In a preferred embodiment, a gas tungsten arc welding process with high frequency wave pulse current is used to apply heat to a tube. Overlay material in the form of weld wire is pre-heated and mechanically fed into the resultant weld pool. The wire is resistance heated to a temperature lower than its melting point just before the wire contacts the molten weld pool.

The pre-heating of the wire, together with use of the high frequency wave pulse gas tungsten arc welding head, are significant features of the present invention. The control of these parameters produces weld beads with improved uniformity of weld penetration and fusion. Also, the present invention provides for improvements in the control of dilution, composition of the weld overlay, and in the smoothness and evenness of the exterior surface finish. The present invention provides relatively accurate control of thickness of the overlay and, consequently, of the final dimensions of the overlaid tube.

Preferably, the tube is positioned on rollers to support the tube's weight, and the tube is rotated with respect to the weld head while the weld head moves along the longitudinal axis of the tube.

BRIEF DESCRIPTION OF THE DRAWINGS

The foregoing, as well as other objects of the present invention, will be further apparent from the following detailed description of the preferred embodiment of the invention, when taken together with the accompanying specification and the drawings, in which:

FIG. 1 is a schematic illustration of a weld overlay system constructed in accordance with the present invention, and shows a welding head and the pre-heating of wire used for weld metal overlay for a metal tube;

FIG. 2 is a schematic illustration of equipment used for performing weld overlay in accordance with the present invention; and FIG. 3 is a longitudinal cross sectional view of a tube with weld overlay applied in accordance with the present invention.

DESCRIPTION OF THE PREFERRED EMBODIMENT

The accompanying drawings and the description which follows set forth this invention in its preferred embodiment. However, it is contemplated that persons generally familiar with welding systems and techniques will be able to apply the novel characteristics of the structures illustrated and described herein in other contexts by modification of certain details. Accordingly, the drawings and description are not to be taken as restrictive on the scope of this invention, but are to be understood as broad and general teachings.

Referring now to the drawings in detail, wherein like reference characters represent like elements or features throughout the various views, the welding system of the present invention is indicated generally in the figures by reference character 10.

Referring now in more detail to the embodiment chosen for the purpose of illustrating the present invention, reference numeral 10a in FIG. 1 denotes a metal tube having weld metal overlay 11. A carbon and low alloy steel material is typical stock for tube 10a, and alloy 625 is suitable weld overlay material 11. However, the method and apparatus of the present invention are equally suitable for any other tube stock or other weld overlay material.

The weld overlay material in the form of wire 11a is applied at a first location 12 on tube 10a by heating the tube boa using a high frequency wave pulse gas tungsten arc welding (GTAW) torch, or welding head, generally 13, which is also known as a tungsten inert gas (TIG) torch. Gas tungsten arc welding power supply 20 provides power to the welding head 13, and a wire feeder 15 associated with pre-heat holder 14 feeds metal overlay wire 11a to location 12.

Alternating current (a.c.) power supply 16 preheats the weld wire overlay 11a by resistance heating through cable 17, and wire 11a is fed through a holder 14 into the weld overlay location 12.

Inert gas 19 is directed against weld overlay location 12 to protect the wire 11a from oxidation. The inert gas is, in one preferred embodiment, a mixture of Argon and Helium, or a mixture of Argon and Hydrogen, with a flow rate of between 30 and 40 CFH (cubic feet per hour).

The pre-heating of weld wire overlay 11a is controlled by adjusting the current supplied to pre-heat holder 14 from the power supply 16. The preheat holder 14 is, in one preferred embodiment, positioned at an angle of 30 to 60 degrees with respect to the welding head 13.

The gas tungsten arc welding head 13, together with preheat holder 14, is longitudinally advanced using a welding robot 22 mounted on a track 24, while the tube stock 10 is simultaneously rotated beneath the torch 13 in the direction indicated by the arrow 18. As shown in FIG. 1, when viewed from the right end of tube stock 10 the tube (FIG. 2), tube 10 rotates in a clockwise direction, and the GTAW head 13 is preferably positioned at 20 to 35 degrees from the top of the tube stock. By, and in conjunction with, the addition of high frequency wave pulsing to the GTAW torch head, the tube stock overlay 28 can be produced with dilution of less than 20%.

During operation, the weld head 13 oscillates in a direction generally parallel to the longitudinal axis of the tube stock 10, and the height of the weld head 13 is controlled through use of an automatic arc voltage control, which provides precise arc length.

To control the temperature of the tube stock 10a and to control the rate of cooling of the weld overlay metal, water flows through the tube stock 10 during the welding process, as shown in FIG. 2.

As also shown in FIG. 2, welding robot 22 is mounted on track 24, and moves along the length of the tube stock 10a while applying the overlay to tube 10a in a single pass.

In a preferred embodiment, one end of the tube stock is gripped in a chuck 30, which is rotationally driven by an electric motor (not shown) or other suitable means. Each end of the tube stock is capped by rotary unions with hoses 32 coupled to the rotary unions, which introduce water into one end of the tube stock and withdraws it from the other.

The welding robot 22 arm extends through a suitable mounting bracket to hold welding head 13 and pre-heat holder 14, preferably at an angle of 20 to 35 degrees from the top of the tube stock.

During operation, the welding robot 22 moves along the longitudinal axis of the tube stock. The tube stock simultaneously rotates underneath the welding robot arm, while the weld pool is mechanically oscillated by the welding robot head in the longitudinal axis of the tube stock to provide a smooth surface finish.

The speed at which the robot 22 moves along the axis of the tube stock is controlled with respect to the speed at which the tube is rotated, so the weld head 13 is advanced by a distance equal to the width of the weld bead for each rotation of the tube.

To support the weight of the tube stock along its length, metal roller supports 34 are provided. These metal rollers 34 are positioned along the length of the tube stock.

At the initiation of the weld overlay process, the robot 22 starts at the chuck end of the tube stock and moves on the track 24 along the axis of the tube stock until the desired length of weld overlay is completed. The position and movements of the welding robot 22 are controlled through control pendants or other operator interfaces, and specific welding parameters are preferably controlled through robot software interfaces.

FIG. 3 is a longitudinal cross sectional view of a tube with weld overlay. There are three primary zones in an overlaid pipe: (1) the weld; (2) the heat-affected zone; and (3) unaffected base metal. The boundary between the weld and the heat-affected zone is also known as the "fusion boundary". The nature of the gas tungsten arc high frequency wave pulse welding process allows for extremely close control of the welding parameters. By close control of the welding parameters, the heat input on the tube stock can also be controlled. Controlling the heat input during welding produces weld overlay with a generally accurate control of dilution, and a reduced heat-affected zone and solid uniform fusion line. This, along with a smooth and even exterior finish provided by the weld overlay system of the present invention, makes the overlaid tubes easier to bend and should prolong tube life.

Example

In one example of application of the present invention, tube stock 10 two and half inches (2.50" O.D) diameter SA-210 material was weld-overlaid using gas tungsten arc high frequency pulse current with pre-heat of weld wire overlay. The tube stock was rotated at four (4) to seven (7) rotations per minute (RPM). Cooling water with temperature of 80 to 120 degrees F. flowed through the tube at a rate of seven (7) to twelve (12) gallons per minute. Overlay material alloy 625 in a form of weld wire with diameter of 0.045 inches was pre-heated by AC power supply 16 with frequency set at 30 to 80 Hz at current amperage of 75 to 100 AC amps and 6 to 8 AC volts. The weld wire was shielded by a gas mixture of Argon and Helium, or a gas mixture of Argon and Hydrogen, at 35 to 40 cubic feet per hour (CFH). Gas tungsten arc (GTAW) weld torch 13 was positioned at 20 to 35 degrees head angle and applied heat to tube stock 10. The GTAW weld torch operated at a wave pulse frequency of between 300 and 600 Hz, 200 to 400 amps, and voltage of 8 to 12 volts with a gas mixture of Argon (25%) and Helium (75%), or a gas mixture of Argon (95%) and Hydrogen (5%), and flow rate of 35 to 40 cubic feet per minute (CFM). Weld overlay with deposit thickness of 0.070" was deposited on the outer surface of the tube stock with a smooth surface finish.

While preferred embodiments of the invention have been described using specific terms, such description is for present illustrative purposes only, and it is to be understood that changes and variations to such embodiments, including but not limited to the substitution of equivalent features or parts, and the reversal of various features thereof, may be practiced by those of ordinary skill in the art without departing from the spirit or scope of the present invention and the claims.

What is claimed is:

1. A process for applying an overlay material to a tube, the process comprising:

preheating the overlay material to a temperature lower than the melting point of the overlay material and placing the overlay material adjacent the tube;

using a high frequency wave pulse gas tungsten arc weld head to melt said preheated overlay material by applying a high frequency wave pulse current to the tube; and using a high frequency wave pulse gas tungsten arc weld head to apply a bead of said melted overlay material to the tube.

2. The process as defined in claim 1, wherein the bead of melted overlay material has dilution of less than twenty percent.

3. The process as defined in claim 1, further comprising rotating the tube between four and seven rotations per minute as the bead of melted overlay material is applied thereto.

4. The process as defined in claim 1, wherein the step of applying the overlay material to the tube includes using a robotic high frequency wave pulse gas tungsten arc weld head, and further comprising moving said robotic high frequency wave pulse gas tungsten arc weld head along substantially the length of the tube as the overlay material is applied to the tube.

5. The process as defined in claim 1, wherein the step of applying the overlay material to the tube includes using a robotic high frequency wave pulse gas tungsten arc weld head, and further comprising moving said robotic high frequency wave pulse gas tungsten arc weld head on a track along substantially the length of the tube as the overlay material is applied to the tube.

6. The process as defined in claim 1, further comprising forming a weld pool on the tube where said bead of overlay material is applied to the tube and oscillating, said weld pool as said overlay material is applied to the tube.

7. The process as defined in claim 1, wherein said applying of the overlay material to the tube is performed using a high frequency wave pulse gas tungsten arc weld head angled between twenty and thirty degrees with respect to the tube.

8. The process as defined in claim 1, wherein said melting of said preheated overlay material and said applying of said bead of melted overlay material to the tube is performed substantially simultaneously using a high frequency wave pulse gas tungsten arc weld head and during a single pass of said weld head with respect to the tube.

9. The process as defined in claim 1, further comprising controlling the height of said high frequency wave pulse gas tungsten arc weld head with respect to the tube using an automatic arc voltage control.

10. The process as defined in claim 1, wherein the step of applying the overlay material to the tube includes using said high frequency wave pulse gas tungsten arc weld head with a voltage of between eight and twelve volts.

11. The process as defined in claim 1, wherein the step of applying the overlay material to the tube includes using a said high frequency wave pulse gas tungsten arc weld head with amperage of between two hundred and four hundred amperes.

12. The process as defined in claim 1, wherein the step of applying the overlay material to the tube includes using said high frequency wave pulse gas tungsten arc weld head for generating said high frequency wave pulse current at a wave pulse frequency of between three hundred and six hundred Hertz.

13. The process as defined in claim 1, wherein said step of preheating the overlay material is performed using resistance heating.

14. The process as defined in claim 1, wherein said step of preheating the overlay material is performed using an electric preheating holder with a voltage of between six and eight volts.

15. The process as defined in claim 1, wherein said step of preheating the overlay material is performed using an electric preheating holder with an amperage of between seventy-five and eighty amperes.

16. The process as defined in claim 1, wherein said step of preheating the overlay material is performed using an electric preheating holder having a frequency of between thirty and eighty Hertz.

17. The process as defined in claim 1, wherein said step of preheating the overlay material is performed using an electric preheating holder positioned between thirty and sixty degrees with respect to the tube.

18. The process as defined in claim 1, wherein said step of preheating the overlay material is performed using an electric preheating holder positioned between twenty and thirty-five degrees with respect to the tube.

19. The process as defined in claim 1, further comprising shielding the overlay material with an inert gas mixture of Argon and Helium as the overlay material is applied to the tube.

20. The process as defined in claim 1, further comprising shielding the overlay material with an inert gas mixture of Argon and Hydrogen as the overlay material is applied to the tube.

21. The process as defined in claim 1, further comprising shielding the overlay material with an inert gas mixture of approximately 95% Argon and approximately 5% Hydrogen as the overlay material is applied to the tube.

22. The process as defined in claim 1, further comprising shielding the overlay material with an inert gas mixture of Argon and Hydrogen delivered at the rate of between thirty-five and forty cubic feet per hour as the overlay material is applied to the tube.

23. The process as defined in claim 1, further comprising shielding the overlay material with an inert gas at the rate of between thirty-five and forty cubic feet per hour as the overlay material is applied to the tube.

24. The process as defined in claim 1, further comprising shielding the overlay material with an inert gas mixture of approximately 25% Argon and approximately 75% Helium as the overlay material is applied to the tube.

25. A process for applying an overlay material to a tube, the process comprising:
   preheating the overlay material to a temperature lower than the melting point of the overlay material and placing the overlay material adjacent the tube;
   providing a high frequency wave pulse gas tungsten arc weld head for generating a high frequency wave pulse current;
   melting the overlay material with said high frequency wave pulse gas tungsten arc weld head by applying said wave pulse current to the tube; and
   applying a bead of said melted overlay material to the tube using said high frequency wave pulse gas tungsten arc weld head.

26. A process for applying an overlay material to a tube, the process comprising:
   preheating the overlay material to a temperature lower than the melting point of the overlay material and placing the overlay material adjacent the tube;
   providing a high frequency wave pulse gas tungsten arc weld head for generating a high frequency wave pulse current;
   melting said preheated overlay material with said high frequency wave pulse weld head by applying a wave pulse current to the tube having a frequency of between three hundred and six hundred Hertz;
   applying a bead of said melted overlay material to the tube with said high frequency wave pulse weld head; and
   moving said high frequency wave pulse weld head along the tube as the overlay material is applied to the tube.

27. A process for applying an overlay material to a tube, the process comprising:
   providing a robotic high frequency wave pulse gas tungsten arc weld head for generating a high frequency wave pulse current;
   melting the overlay material with said weld head by applying a wave pulse current to the tube having a frequency of between three hundred and six hundred Hertz;
   applying a bead of said melted overlay material to the tube with dilution of less than twenty percent using said weld head;
   forming a weld pool on the tube where said bead of melted overlay material is applied to the tube;
   oscillating said weld pool as said overlay material is applied to the tube; and
   moving said weld head along the tube as the overlay material is applied to the tube.

28. A process for applying an overlay material to a tube, the process comprising:
   preheating the overlay material to a temperature lower than the melting point of the overlay material and placing the overlay material adjacent the tube;
   providing a robotic high frequency wave pulse gas tungsten arc weld head for generating a high frequency wave pulse current;
   melting said preheated overlay material with said weld head by applying a wave pulse current to the tube having a frequency of between three hundred and six hundred Hertz;
   applying a bead of said melted overlay material to the tube with dilution of less than twenty percent using said weld head;
   forming a weld pool on the tube where said bead of melted overlay material is applied to the tube;
   oscillating said weld pool as said overlay material is applied to the tube; and
   moving said weld head along the tube as the overlay material is applied to the tube.

29. A tube having an overlay of weld material, comprising the overlay being formed by preheating the weld material to a temperature lower than the melting point of the weld; melting said preheated weld material by applying a high frequency wave pulse current to the tube using a high frequency wave pulse gas tungsten arc weld head; and applying a bead of said melted weld material to the tube using said weld head to form an overlay on the tube.

30. A tube having an overlay of weld material, comprising the overlay being formed by preheating the weld material to a temperature lower than the melting point of the weld; melting said preheated weld material by applying a high frequency wave pulse current using a high frequency wave pulse gas tungsten arc weld head in a frequency range between three hundred and six hundred Hertz; forming a weld pool on the tube with said melted weld material; and oscillating said weld pool simultaneously while using said high frequency wave pulse gas tungsten arc weld head to apply said melted weld material to said weld pool for forming an overlay on the tube.

31. A system for overlaying weld material on a tube, comprising:
   a tube holder for holding the tube;
   a preheater for preheating the weld material to a temperature lower than the melting point of the weld material;
   a holder for placing the weld material adjacent the tube;
   a robotic high frequency wave pulse gas tungsten arc weld head for generating a high frequency wave pulse current for melting the weld material using said high frequency wave pulse current and for applying a bead of said melted weld material to the tube; and
   a track for carrying said robotic high frequency wave pulse gas tungsten arc weld head along the tube.

32. A system for overlaying weld material on a tube, comprising:
   means for holding for the tube;
   means for preheating the weld material to a temperature lower than the melting point of the weld material;
   means for placing the weld material adjacent the tube;
   a high frequency wave pulse gas tungsten arc weld head for generating a high frequency wave pulse current for melting the weld material using said high frequency wave pulse current, said high frequency wave pulse gas tungsten arc weld head being configured to apply a bead of said melted weld material to the tube; and
   means for carrying said high frequency wave pulse gas tungsten arc weld head along the tube.

33. A process for applying an overlay material to a tube, the process comprising:

preheating the overlay material to a temperature lower than the melting point of the overlay material and placing the overlay material adjacent the tube;

using a high frequency wave pulse gas tungsten arc weld head to melt said preheated overlay material by applying a high frequency wave pulse current to the tube;

controlling the height of said weld head with respect to the tube using an automatic arc voltage control; and using a high frequency wave pulse gas tungsten arc weld head to apply a bead of said melted overlay material to the tube with a dilution of less than twenty percent.

34. A process for applying an overlay material to a tube, the process comprising:

preheating the overlay material to a temperature lower than the melting point of the overlay material and placing the overlay material adjacent the tube;

using a high frequency wave pulse gas tungsten arc weld head to melt said preheated overlay material by applying a high frequency wave pulse current to the tube;

forming a weld pool on the tube where said bead of overlay material is applied to the tube and oscillating said weld pool as said overlay material is applied to the tube;

controlling the height of said weld head with respect to the tube using an automatic arc voltage control; and using a high frequency wave pulse gas tungsten arc weld head to apply a bead of said melted overlay material to the tube with a dilution of less than twenty percent.

35. A process for applying an overlay material to a tube, the process comprising:

preheating the overlay material to a temperature lower than the melting point of the overlay material and placing the overlay material adjacent the tube;

using a high frequency wave pulse gas tungsten arc weld head to melt said preheated overlay material by applying a wave pulse current at a wave pulse frequency of between three hundred and six hundred Hertz to the tube;

controlling the height of said weld head with respect to the tube using an automatic arc voltage control;

using a high frequency wave pulse gas tungsten arc weld head angled between twenty and thirty degrees with respect to the tube to apply a bead of said melted overlay material to the tube with a dilution of less than twenty percent; and forming a weld pool on the tube where said bead of overlay material is applied to the tube and oscillating said weld pool as said overlay material is applied to the tube.

36. A process for applying an overlay material to a tube, the process comprising:

preheating the overlay material to a temperature lower than the melting point of the overlay material and placing the overlay material adjacent the tube; and using a high frequency wave pulse gas tungsten arc weld head to substantially simultaneously melt said preheated overlay material and apply a bead of said melted overlay material to the tube with a dilution of less than twenty percent.

* * * * *